United States Patent
Pan et al.

(10) Patent No.: US 11,524,276 B2
(45) Date of Patent: Dec. 13, 2022

(54) P-TYPE TIO2/N-TYPE WO3 HETEROJUNCTION CATALYST, ITS PREPARATION AND USE IN PHOTOCHEMICAL SYNTHESIS OF FUELS

(71) Applicant: Tianjin University, Tianjin (CN)

(72) Inventors: Lun Pan, Tianjin (CN); Jijun Zou, Tianjin (CN); Ying Chen, Tianjin (CN); Xiangwen Zhang, Tianjin (CN); Li Wang, Tianjin (CN)

(73) Assignee: Tianjin University, Tianjin (CN)

( * ) Notice: Subject to any disclaimer, the term of this patent is extended or adjusted under 35 U.S.C. 154(b) by 76 days.

(21) Appl. No.: 17/060,770

(22) Filed: Oct. 1, 2020

(65) Prior Publication Data

US 2021/0322954 A1 Oct. 21, 2021

(30) Foreign Application Priority Data

Apr. 17, 2020 (CN) .......................... 202010303282.8

(51) Int. Cl.
| | | |
|---|---|---|
| *B01J 21/06* | (2006.01) | |
| *B01J 23/30* | (2006.01) | |
| *B01J 35/00* | (2006.01) | |
| *C10L 1/04* | (2006.01) | |

(52) U.S. Cl.
CPC ............. *B01J 21/063* (2013.01); *B01J 23/30* (2013.01); *B01J 35/004* (2013.01); *C10L 1/04* (2013.01); *B01J 2523/47* (2013.01); *B01J 2523/69* (2013.01); *C10L 2290/36* (2013.01)

(58) Field of Classification Search
CPC ...... B01J 21/063; B01J 23/30; B01J 2523/47; B01J 23/69; B01J 35/004; B01J 35/00
See application file for complete search history.

(56) References Cited

U.S. PATENT DOCUMENTS

| | | | | |
|---|---|---|---|---|
| 2010/0043873 A1* | 2/2010 | Kim | ...................... | H01L 31/032 257/E29.097 |
| 2011/0297225 A1* | 12/2011 | Chang | ............. | H01L 31/022425 136/256 |

OTHER PUBLICATIONS

Joice et al., WO3 Nanorods Supported on Mesoporous TiO2 Nanotubes as One-Dimensional Nanocomposites for Rapid Degradation of Methylene Blue under Visible Light Irradiation, 2019, The Journal of Physical Chemistry, vol. 123, pp. 27448-27464 (Year: 2019).*

* cited by examiner

*Primary Examiner* — Coris Fung
*Assistant Examiner* — Ritu S Shirali
(74) *Attorney, Agent, or Firm* — Quinn IP Law

(57) ABSTRACT

Provided is a p-type $TiO_2$/n-type $WO_3$ heterojunction catalyst and a preparation method and use thereof. The catalyst comprises p-type $TiO_2$ and n-type $WO_3$ supported on a surface of the p-type $TiO_2$.

10 Claims, No Drawings

P-TYPE TIO2/N-TYPE WO3 HETEROJUNCTION CATALYST, ITS PREPARATION AND USE IN PHOTOCHEMICAL SYNTHESIS OF FUELS

CROSS-REFERENCE TO RELATED APPLICATIONS

This application claims the benefit of priority to Chinese patent application no. 202010303282.8 filed on Apr. 17, 2020, which is incorporated by reference in its entirety.

TECHNICAL FIELD

The present disclosure relates to the field of the catalytic technologies, and in particular to a p-type titanium dioxide ($TiO_2$)/n-type tungsten trioxide ($WO_3$) heterojunction catalyst, a preparation method thereof and use of the catalyst in photochemical synthesis of fuels.

BACKGROUND

Rapid development of the aerospace industry has imposed increased requirement on the fuels used therein. Accordingly, it is urgently needed to develop a high-density fuel having a higher density and heating value. Several methods for the synthesis of a high-density fuel are known in the art. Zinc (Zn) and lanthanum (La) doped titanium oxide ($TiO_2$) may be used as a photocatalyst in a cycloaddition reaction for converting norbornadiene into quadricyclane under light irradiation. The zinc is present in the photocatalyst as zinc oxide and distributed on surfaces of the $TiO_2$ particles. A different synthesis method may use zinc oxide (ZnO) and cadmium sulfide (CdS) as a photocatalyst to catalyze the cycloaddition of norbornadiene under oxygen rich conditions, to produce quadricyclane. Further, $Rh(CO)_4Cl_2$ may serve as a catalyst for driving an isomerization reaction of dicyclopentadiene and a substituted dicyclopentadiene under light irradiation to produce pentacyclo[$5.3.0.0^{2,6}.0^{3,9}.0^{5,8}$]decane with a cage-like structure. However, the prior art catalysts are inefficient in catalyzing the synthesis of the high-density fuels from fuel substrates, and cannot meet the requirements of the aerospace industry.

In view of the above, a catalyst according to the present disclosure is proposed.

SUMMARY

One objective of the present disclosure is to provide a p-type $TiO_2$/n-type $WO_3$ heterojunction catalyst with the n-type $WO_3$ supported on a surface of the p-type $TiO_2$. The catalyst of the disclosure has high catalytic efficiency, and is particularly suitable for use in photocatalytic processes for synthesizing fuels.

Accordingly, the above objective of the disclosure is realized by a p-type $TiO_2$/n-type $WO_3$ heterojunction catalyst, comprising:
p-type $TiO_2$; and n-type $WO_3$ supported on a surface of the p-type $TiO_2$.

Further, the catalyst may have a p-type $TiO_2$ content of 60% to 90% by mass with respect to the total mass of the catalyst.

Another objective of the disclosure is to provide a method for preparing the p-type $TiO_2$/n-type $WO_3$ heterojunction catalyst as described above, the method comprising:
supporting the n-type $WO_3$ onto a surface of the p-type $TiO_2$ to obtain the catalyst.

In particular, the method may comprise:
dissolving a titanium salt in a mixed solution of glycerol and a first alcohol to form a first mixture;
dissolving a tungsten salt and a product resulting from a first heating process for heating the first mixture in a second alcohol to form a second mixture; and
calcining a product resulting from a second heating process for heating the second mixture to produce the catalyst.

Further, the first heating process may be carried out at a temperature of 50 to 250° C. for 1 to 48 hours.

The first alcohol preferably comprises at least one of methanol, ethanol, propanol, and isopropanol.

The titanium salt preferably comprises at least one of titanium acetate, titanium oxalate, titanium chloride, tetrabutyl titanate, titanium nitrate, and titanium sulfate.

Preferably, the second heating process is carried out at a temperature of 50 to 250° C. for 1 to 48 hours.

Preferably, the calcining step is carried out at a temperature of 200 to 800° C. for 2 to 24 hours.

Preferably, the tungsten salt comprises at least one of tungsten chloride, ammonium tungstate, ammonium metatungstate, and ammonium paratungstate.

The second alcohol preferably comprises at least one of methanol, ethanol, propanol, and isopropanol.

A further objective of the disclosure is to provide the use of the p-type $TiO_2$/n-type $WO_3$ heterojunction catalyst as described above in photochemical synthesis of fuels.

In particular, the catalyst may be used in the synthesis of a fuel from a fuel substrate under light irradiation, wherein the fuel substrate may comprise at least one of norbornene, dicylopentadiene, norbornadiene, isophorone, and cyclohexenone.

Preferably, the fuel substrate comprises norbornene and isophorone, or, the fuel substrate comprises norbornene and cyclohexenone.

Preferably, when the catalyst as described above is used in the synthesis of a fuel from a fuel substrate, the amount of the catalyst added is from 1% to 10% by mass with respect to the total amount of the fuel substrate.

Preferably, the fuel is synthesized from the fuel substrate in a solvent.

Preferably, the solvent comprises at least one of dichloromethane, normal pentane, dichloroethane, and cyclohexane.

Preferably, the synthesis of the fuel from the fuel substrate, in the presence of the catalyst, is carried out at a temperature of 0 to 80° C. for 1 to 24 hours under irradiation of a high-pressure mercury lamp.

The fuel preferably comprises a high-density fuel, further preferably a multi-cyclic fuel for aerospace propulsion.

Particularly preferably, the fuel comprises at least one of pentacyclo[$8.2.1.1^{4,7}.0^{2,9}.0^{8,3}$]tetradecane, pentacyclo [$5.3.0.0^{2,6}.0^{3,9}.0^{5,8}$]decane, and quadricyclane.

Compared with the prior art catalysts, the catalyst according to the present disclosure has several advantages.

The present disclosure proposes to support n-type $WO_3$ onto a surface of p-type $TiO_2$ to obtain a p-type $TiO_2$/n-type $WO_3$ heterojunction catalyst, which has high catalytic efficiency and is particularly suitable for use in photocatalytic processes for synthesizing fuels. Moreover, the catalyst according to the disclosure is effective in synthesizing high-density fuels, and is also cheap and suitable for large-scale applications.

DETAILED DESCRIPTION

Embodiments of the present disclosure will be described below. It should be understood, however, that the embodiments are provided to further illustrate the present disclosure and not to be taken as limiting the scope of the disclosure. Reaction conditions not indicated in the following exemplary embodiments can be conventional or can be carried out following the manufacturer's recommendations. Reagents or instruments used in the exemplary embodiments without specified manufacturers can be any commercially available ones.

A first aspect of the present disclosure provides a p-type $TiO_2$/n-type $WO_3$ heterojunction catalyst which comprises:
p-type $TiO_2$; and n-type $WO_3$ supported on a surface of the p-type $TiO_2$.

The present disclosure proposes to support n-type $WO_3$ onto a surface of p-type $TiO_2$ to obtain a p-type $TiO_2$/n-type $WO_3$ heterojunction catalyst, which has high catalytic efficiency and is particularly suitable for use in photocatalytic processes for synthesizing fuels. Moreover, the catalyst is effective in synthesizing high-density fuels, and is also cheap and suitable for large-scale applications.

As compared with the p-type $TiO_2$/n-type $WO_3$ heterojunction catalyst according to the first aspect of the disclosure, supporting the n-type $WO_3$ onto a surface of n-type $TiO_2$ may result in an n-n junction structure with a weak internal electric field, leading to low charge separation efficiency.

It is to be understood that after the n-type $WO_3$ is loaded/supported on the surface of the p-type $TiO_2$ according to the present disclosure, a heterojunction forms at an interface between the n-type $WO_3$ and the p-type $TiO_2$. Such a heterojunction formed between the p-type semiconductor and the n-type semiconductor can have a stronger internal electric field than the n-n heterojunction, due to the fact that the p-type semiconductor has a Fermi level in a lower portion of the forbidden band and close to the valence band and thus there is a large difference in energy between the Fermi level of the n-type semiconductor and the Fermi level of the p-type semiconductor. The heterojunction with a stronger internal electric field can facilitate charge separation and improve the reaction activity of the catalyst. Therefore, the catalyst according to the first aspect of the disclosure can be effective in the photocatalytic processes for synthesizing fuels, particularly high-density fuels, from fuel substrates.

In some embodiments, the catalyst has a p-type $TiO_2$ content of 60% to 90% by mass, such as 60%, 70%, 80%, or 90% by mass, with respect to the total mass of the catalyst. When the content of the p-type $TiO_2$ is too low, the n-type $WO_3$ supported on the p-type $TiO_2$ may be too close together or even accumulate so that the p-type $TiO_2$ cannot be exposed at all, thereby adversely influencing the reaction; while when the content of the p-type $TiO_2$ is too high, the n-type $WO_3$ may be dispersed on the p-type $TiO_2$ too thinly, adversely influencing construction of the heterojunction structure.

A second aspect of the present disclosure provides a method for preparing the catalyst according to the first aspect of the disclosure, the method comprising supporting the n-type $WO_3$ onto a surface of the p-type $TiO_2$ to obtain the p-type $TiO_2$/n-type $WO_3$ heterojunction catalyst.

This method is simple and easy to implement and is adapted for large-scale industrial application.

In some embodiments, the method according to the second aspect of the disclosure comprises a step of dissolving a titanium salt in a mixed solution of glycerol and a first alcohol to form a first mixture.

In a particular embodiment, the first alcohol comprises at least one of methanol, ethanol, propanol, and isopropanol. In a particular embodiment, the titanium salt comprises at least one of titanium acetate, titanium oxalate, titanium chloride, tetrabutyl titanate, titanium nitrate, and titanium sulfate. So, the method of the present disclosure makes it possible to use a wide range of cheap raw materials for the preparation of the catalyst as described above.

In the embodiments, the method according to the second aspect of the disclosure further comprises a step of dissolving a tungsten salt and a product resulting from a first heating process for heating the first mixture in a second alcohol to form a second mixture.

In a particular embodiment, the first heating process is carried out at a temperature of 50 to 250° C., such as 50° C., 100° C., 150° C., 200° C., or 250° C., for 1 to 48 hours, such as 2 hours, 10 hours, 15 hours, 20 hours, 25 hours, 30 hours, 35 hours, 40 hours, or 48 hours. After completion of the first heating process, titanium glycerol, namely a complex compound of glycerol and titanium, is formed, and can also be called an p-type titanium dioxide precursor.

It is to be understood that the product resulting from the first heating process for heating the first mixture is the titanium glycerol described above. The product (namely, titanium glycerol) may be obtained by subjecting a solution resulting from the first heating process for heating the first mixture to a solid-liquid separation.

In a particular embodiment, the tungsten salt comprises at least one of tungsten chloride, ammonium tungstate, ammonium metatungstate, and ammonium paratungstate. In a particular embodiment, the second alcohol comprises at least one of methanol, ethanol, propanol, and isopropanol. So, the method of the present disclosure makes it possible to use a wide range of cheap raw materials for the preparation of the catalyst as described above.

In the embodiments, the method according to the second aspect of the present disclosure yet further comprises a step of calcining a product resulting from a second heating process for heating the second mixture to obtain the p-type $TiO_2$/n-type $WO_3$ heterojunction catalyst.

In a particular embodiment, the second heating process is carried out at a temperature of 50 to 250° C., such as 50° C., 100° C., 150° C., 200° C., or 250° C., for 1 to 48 hours, such as 2 hours, 10 hours, 15 hours, 20 hours, 25 hours, 30 hours, 35 hours, 40 hours, or 48 hours.

The product resulting from the second heating process for heating the second mixture may be obtained by subjecting a solution resulting from the second heating process to a solid-liquid separation.

In a particular embodiment, the calcining step is carried out at a temperature of 200 to 800° C., such as 200° C., 300° C., 400° C., 500° C., 600° C., 700° C., or 800° C., for 2 to 24 hours, such as 2 hours, 10 hours, 15 hours, 20 hours, or 24 hours. The calcining process allows the titanium glycerol to be converted into n-type titanium dioxide ($TiO_2$) and tungsten trioxide ($WO_3$) to be supported onto a surface of the n-type $TiO_2$, so that a p-type $TiO_2$/n-type $WO_3$ heterojunction catalyst is produced.

In some particular embodiments, the method for preparing the p-type $TiO_2$/n-type $WO_3$ heterojunction catalyst of the present disclosure comprises steps of:

(1) mixing 1 to 40 mL of glycerol and 1 to 100 mL of an alcohol into a homogeneous state by stirring so as to obtain a mixed solution;

(2) adding 1 to 20 g of a titanium salt to the mixed solution obtained in step (1) and stirring until a homogeneous state is obtained;

(3) transferring the resulting mixture from step (2) into a Teflon-lined autoclave to perform a reaction at a temperature of 50 to 250° C. for 1 to 48 hours;

(4) after completion of the reaction and allowing the autoclave to cool to room temperature, subjecting a product produced by the reaction to centrifugation, and then to be washed several times with ethanol and water and dried in an oven at 60 to 100° C. for 6 to 24 hours;

(5) dissolving 1 to 100 mg of a tungsten salt in 10 to 100 mL of an alcohol and mixing by stirring to form a homogeneous solution, to which the dried product obtained from step (4) is then added and mixed by stirring until homogeneous;

(6) transferring the resulting solution from step (5) into a Teflon-lined autoclave to perform a reaction at a temperature of 50 to 250° C. for 1 to 48 hours;

(7) after completion of the reaction in step (6) and allowing the autoclave to cool to room temperature, subjecting a product produced by the reaction to centrifugation, and then to be washed several times with ethanol and water and dried in an oven at 60 to 100° C. for 6 to 24 hours; and (8) calcining the resulting product from step (7) at 200 to 800° C. for 2 to 24 hours so as to obtain the p-type $TiO_2$/n-type $WO_3$ heterojunction catalyst after cooling to room temperature.

Advantageously, the method of the present disclosure as described above is simple and makes it possible to utilize a wide range of cheap raw materials. So, this method is suitable as an industrial process.

A third aspect of the present disclosure provides use of the p-type $TiO_2$/n-type $WO_3$ heterojunction catalyst as described above in photochemical synthesis of fuels.

In some particular embodiments of the disclosure, the catalyst is used in the synthesis of a fuel from a fuel substrate under light irradiation, wherein the fuel substrate comprises at least one of norbornene, dicylopentadiene, norbornadiene, isophorone, and cyclohexenone. Preferably, the fuel substrate comprises norbornene and isophorone, or, the fuel substrate comprises norbornene and cyclohexenone.

In some embodiments, by means of the catalyst of the present disclosure, the conversion of the fuel substrate can be as high as 95%.

In a particular embodiment, the amount of the catalyst added is from 1% to 10% by mass, such as 1%, 3%, 5%, 7%, 9%, or 10% by mass, with respect to the total amount of the fuel substrate.

In a particular embodiment, the fuel is synthesized from the fuel substrate in a solvent. In a particular embodiment, the solvent comprises at least one of dichloromethane, normal pentane, dichloroethane, and cyclohexane. The use of the solvent favours the synthesis of the fuel from the fuel substrate.

In a particular embodiment, the synthesis of the fuel from the fuel substrate, in the presence of the catalyst of the present disclosure, is carried out at a temperature of 0 to 80° C., such as 0° C., 20° C., 40° C., 60° C., or 80° C., for 1 to 24 hours, such as 1 hour, 5 hours, 10 hours, 15 hours, 20 hours, or 24 hours, under irradiation of a high-pressure mercury lamp. The disclosed p-type $TiO_2$/n-type $WO_3$ heterojunction catalyst allows the photochemical synthesis process for producing the fuels to be simple and to proceed under mild conditions, and can be suitable for the synthesis of various norbornene derivatives. The catalyst of the present disclosure is thus highly valuable in the industry.

In a particular embodiment, the fuel comprises a high-density fuel, preferably a multi-cyclic fuel for aerospace propulsion. In a further particular embodiment, the fuel comprises at least one of pentacyclo[$8.2.1.1^{4,7}.0^{2,9}.0^{8,3}$] tetradecane, pentacyclo[$5.3.0.0^{2,6}.0^{3,9}.0^{5,8}$]decane, and quadricyclane. The fuel produced by the photocatalytic process from the fuel substrate utilizing the p-type $TiO_2$/n-type $WO_3$ heterojunction catalyst of the disclosure can meet the requirements of the aerospace industry.

EXAMPLES

The embodiments of the present disclosure will now be described in further detail by way of the following examples. Features of each of the examples may be combined with features of other examples in case of no conflict.

Example 1

20 mL of glycerol and 60 mL of anhydrous ethanol were mixed and stirred for 20 minutes until homogeneous. 2 g of tetrabutyl titanate was added to the mixture and stirred until a clear solution had been obtained. The solution was transferred to a Teflon-lined hydrothermal reactor and was heated at 180° C. for 24 hours. After cooling, the reaction mixture was centrifuged and washed several times with ethanol. Drying was then conducted at 60° C. for 12 hours to obtain a titanium dioxide precursor.

0.536 g of tungsten hexachloride was mixed with 80 mL of methanol. The titanium dioxide precursor was added to the mixture and mixed by stirring until a homogeneous solution had been obtained. The solution was transferred to a Teflon liner of an autoclave. The liner was then placed into the autoclave. Thereafter, the autoclave was sealed and placed into a thermostatted oven to perform a reaction at 180° C. for 3 hours. After completion of the reaction, the autoclave was subjected to a rapid cooling process along with the resulting reaction product contained therein. After cooling to room temperature, the product was washed with anhydrous ethanol and dried. The dried product was placed into a muffle furnace and calcined at 400° C. for 1 hour. After allowing to cool naturally, a p-type $TiO_2$/n-type $WO_3$ heterojunction catalyst was obtained.

Example 2

20 mL of glycerol and 60 mL of anhydrous ethanol were mixed and stirred for 20 minutes until homogeneous. 2 g of tetrabutyl titanate was added to the mixture and stirred until a clear solution had been obtained. The solution was transferred to a Teflon-lined hydrothermal reactor and was heated at 180° C. for 24 hours. After allowing to cool, the reaction mixture was centrifuged and washed several times with ethanol. Drying was then conducted at 60° C. for 12 hours to obtain a titanium dioxide precursor.

0.344 g of tungsten hexachloride was mixed with 80 mL of methanol. The titanium dioxide precursor was added to the mixture and mixed by stirring until a homogeneous solution had been obtained. The solution was transferred to a Teflon liner of an autoclave. The liner was then placed into the autoclave. Thereafter, the autoclave was sealed and placed into a thermostatted oven to perform a reaction at 180° C. for 3 hours. After completion of the reaction, the autoclave was subjected to a rapid cooling process along with the resulting reaction product contained therein. After allowing to cool to room temperature, the product was washed with anhydrous ethanol and dried. The dried product was placed into a muffle furnace and calcined at 400° C. for 1 hour. After allowing to cool naturally, a p-type $TiO_2$/n-type $WO_3$ heterojunction catalyst was obtained.

Example 3

20 mL of glycerol and 60 mL of anhydrous ethanol were mixed and stirred for 20 minutes until homogeneous. 2 g of tetrabutyl titanate was added to the mixture and stirred until a clear solution had been obtained. The solution was transferred to a Teflon-lined hydrothermal reactor and was heated at 180° C. for 24 hours. After allowing to cool, the reaction mixture was centrifuged and washed several times with ethanol. Drying was then conducted at 60° C. for 12 hours to obtain a titanium dioxide precursor.

0.201 g of tungsten hexachloride was mixed with 80 mL of methanol. The titanium dioxide precursor was added to the mixture and mixed by stirring until a homogeneous solution had been obtained. The solution was transferred to a Teflon liner of an autoclave. The liner was then placed into the autoclave. Thereafter, the autoclave was sealed and placed into a thermostatted oven to perform a reaction at 180° C. for 3 hours. After completion of the reaction, the autoclave was subjected to a rapid cooling process along with the resulting reaction product contained therein. After allowing to cool to room temperature, the product was washed with anhydrous ethanol and dried. The dried product was placed into a muffle furnace and calcined at 400° C. for 1 hour. After allowing to cool naturally, a p-type $TiO_2$/n-type $WO_3$ heterojunction catalyst was obtained.

Example 4

20 mL of glycerol and 60 mL of anhydrous ethanol were mixed and stirred for 20 minutes until homogeneous. 2 g of tetrabutyl titanate was added to the mixture and stirred until a clear solution had been obtained. The solution was transferred to a Teflon-lined hydrothermal reactor and was heated at 180° C. for 24 hours. After allowing to cool, the reaction mixture was centrifuged and washed several times with ethanol. Drying was then conducted at 60° C. for 12 hours to obtain a titanium dioxide precursor.

0.089 g of tungsten hexachloride was mixed with 80 mL of methanol. The titanium dioxide precursor was added to the mixture and mixed by stirring until a homogeneous solution had been obtained. The solution was transferred to a Teflon liner of an autoclave. The liner was then placed into the autoclave. Thereafter, the autoclave was sealed and placed into a thermostatted oven to perform a reaction at 180° C. for 3 hours. After completion of the reaction, the autoclave was subjected to a rapid cooling process along with the resulting reaction product contained therein. After allowing to cool to room temperature, the product was washed with anhydrous ethanol and dried. The dried product was placed into a muffle furnace and calcined at 400° C. for 1 hour. After allowing to cool naturally, a p-type $TiO_2$/n-type $WO_3$ heterojunction catalyst was obtained.

Example 5

20 mL of glycerol and 60 mL of anhydrous ethanol were mixed and stirred for 20 minutes until homogeneous. 2 g of tetrabutyl titanate was added to the mixture and stirred until a clear solution had been obtained. The solution was transferred to a Teflon-lined hydrothermal reactor and was heated at 180° C. for 24 hours. After allowing to cool, the reaction mixture was centrifuged and washed several times with ethanol. Drying was then conducted at 60° C. for 12 hours to obtain a titanium dioxide precursor.

0.013 g of tungsten hexachloride was mixed with 80 mL of methanol. The titanium dioxide precursor was added to the mixture and mixed by stirring until a homogeneous solution had been obtained. The solution was transferred to a Teflon liner of an autoclave. The liner was then placed into the autoclave. Thereafter, the autoclave was sealed and placed into a thermostatted oven to perform a reaction at 180° C. for 3 hours. After completion of the reaction, the autoclave was subjected to a rapid cooling process along with the resulting reaction product contained therein. After allowing to cool to room temperature, the product was washed with anhydrous ethanol and dried. The dried product was placed into a muffle furnace and calcined at 400° C. for 1 hour. After allowing to cool naturally, a p-type $TiO_2$/n-type $WO_3$ heterojunction catalyst was obtained.

Comparative Example 1

An n-type $TiO_2$/n-type $WO_3$ catalyst was prepared according to the method described in Example 1, except that glycerol was not added when the titanium dioxide precursor was prepared.

Comparative Example 2

A p-type $TiO_2$ catalyst was prepared as follows.

A titanium dioxide precursor was prepared according to the method described in Example 1. The titanium dioxide precursor after drying was then placed into a muffle furnace and calcined at 400° C. for 1 hour. After allowing to cool naturally, a p-type $TiO_2$ was obtained.

Comparative Example 3

An n-type $WO_3$ catalyst was prepared as follows.

0.344 g of tungsten hexachloride was mixed with 80 mL of methanol and stirred until a homogeneous solution had been obtained. The solution was transferred to a Teflon liner of an autoclave. The liner was then placed into the autoclave. Thereafter, the autoclave was sealed and placed into a thermostatted oven to perform a reaction at 180° C. for 3 hours. After completion of the reaction, the autoclave was subjected to a rapid cooling process along with the resulting reaction product contained therein. After allowing to cool to room temperature, the product was washed with anhydrous ethanol and dried. The dried product was placed into a muffle furnace and calcined at 400° C. for 1 hour. After allowing to cool naturally, an n-type $WO_3$ catalyst was obtained.

The catalysts prepared in Examples 1 to 5 and Comparative Examples 1 to 3 were each used to catalyze the cycloaddition of norbornadiene under light irradiation to produce a multi-cyclic high-density fuel. In particular, a fuel substrate was introduced into a 50 ml single-port glass reactor. Each of the catalysts was added to the respective substrate in an amount of 5% by mass of the total mass of the fuel substrate. The resulting mixture was stirred and bubbled with nitrogen for 1 hour. The opening of the reactor was sealingly attached to a condensing tube. Cooling water was passed through the condensing tube. The mixture was then irradiated with a high-pressure mercury lamp for 12 hours. The resulting reaction solution was analyzed using Gas Chromatography-Mass Spectrometry (GC-MS) to identify the reaction products, and the conversion rate of the fuel substrate was calculated based on the results of the analysis. The conditions and results of the cycloaddition reaction of different fuel substrates under light irradiation are shown in Table 1.

TABLE 1

| | Fuel Substrate | Mass of the Fuel Substrate (g) | Reaction Temperature (° C.) | Reaction Time (hours) | Product | Yield (%) |
|---|---|---|---|---|---|---|
| Ex. 1 | Norbornene | 20 | 10 | 12 | Pentacyclo[8.2.1.1$^{4,7}$.0$^{2,9}$.0$^{8,3}$]tetradecane | 90 |
| Ex. 2 | Dicylopentadiene | 20 | 10 | 10 | Pentacyclo[5.3.0.0$^{2,6}$.0$^{3,9}$.0$^{5,8}$]decane | 79 |
| Ex. 3 | Norbornadiene | 20 | 30 | 12 | Quadricyclane | 96 |
| Ex. 4 | Norbornene (50 wt. %) | 20 | 80 | 12 | Pentacyclo[8.2.1.1$^{4,7}$.0$^{2,9}$.0$^{8,3}$]tetradecane | 21 |
| | | | | | Decahydro-3,3,4alpha-trimethyl-5,8-methanobiphenylen-1(2H)-one | 53 |
| | Isophorone (50 wt. %) | | | | Octahydro-3,3,4a,7,7,8a-hexamethyl-1,5(2H,4bH)-biphenyldiketone | 24 |
| Ex. 5 | Norbornene (50 wt. %) | 20 | 40 | 5 | Pentacyclo[8.2.1.1$^{4,7}$.0$^{2,9}$.0$^{8,3}$]tetradecane | 12 |
| | | | | | 5,8-methanobiphenylen-1(2H)-one | 34 |
| | Cyclohexenone (50 wt. %) | | | | Octahydro-1,5(2H,4bH)-biphenyldiketone | 19 |
| Comp Ex. 1 | Norbornene | 20 | 10 | 12 | Pentacyclo[8.2.1.1$^{4,7}$.0$^{2,9}$.0$^{8,3}$]tetradecane | 71 |
| Comp Ex. 2 | Norbornene | 20 | 10 | 12 | Pentacyclo[8.2.1.1$^{4,7}$.0$^{2,9}$.0$^{8,3}$]tetradecane | 82 |
| Comp Ex. 3 | Norbornene | 20 | 10 | 12 | Pentacyclo[8.2.1.1$^{4,7}$ 0$^{2,9}$.0$^{8,3}$]tetradecane | 55 |

Finally, it is noted that the above embodiments are provided merely for purposes of illustration and are not intended to limit the scope of the disclosure. Although the embodiments of the disclosure have been described in detail, it should be understood that various modifications and equivalents may be made hereto without departing from the scope of the disclosure.

What is claimed is:

1. A p-type $TiO_2$/n-type $WO_3$ heterojunction catalyst comprising:
   p-type $TiO_2$; and n-type $WO_3$ supported on a surface of the p-type $TiO_2$;
   wherein the p-type $TiO_2$/n-type $WO_3$ heterojunction catalyst has a p-type $TiO_2$ content of 60% by mass to 80% by mass with respect to a total mass of the p-type $TiO_2$/n-type $WO_3$ heterojunction catalyst.

2. A method for preparing the p-type $TiO_2$/n-type $WO_3$ heterojunction catalyst according to claim 1, the method comprising:
   supporting the n-type $WO_3$ onto a surface of the p-type $TiO_2$ to obtain the p-type $TiO_2$/n-type $WO_3$ heterojunction catalyst.

3. The method according to claim 2, further comprising:
   dissolving a titanium salt in a mixed solution of glycerol and a first alcohol to form a first mixture;
   dissolving a tungsten salt and a product resulting from a first heating process for heating the first mixture in a second alcohol to form a second mixture; and
   calcining a product resulting from a second heating process for heating the second mixture to produce the p-type $TiO_2$/n-type $WO_3$ heterojunction catalyst.

4. The method according to claim 3, wherein the first heating process is carried out at a temperature of 50° C. to 250° C. for 1 hour to 48 hours;
   wherein the first alcohol comprises at least one of methanol, ethanol, propanol, and isopropanol;
   wherein the titanium salt comprises at least one of titanium acetate, titanium oxalate, titanium chloride, tetrabutyl titanate, titanium nitrate, and titanium sulfate;
   wherein the second heating process is carried out at a temperature of 50° C. to 250° C. for 1 hour to 48 hours;
   wherein the calcining step is carried out at a temperature of 200° C. to 800° C. for 2 hours to 24 hours;
   wherein the tungsten salt comprises at least one of tungsten chloride, ammonium tungstate, ammonium metatungstate, and ammonium paratungstate; and
   wherein the second alcohol comprises at least one of methanol, ethanol, propanol, and isopropanol.

5. A method of producing a fuel, the method comprising:
   photochemically synthesizing the fuel from a fuel substrate in the presence of the p-type $TiO_2$/n-type $WO_3$ heterojunction catalyst of claim 1.

6. The method according to claim 5, wherein photochemically synthesizing the fuel from the fuel substrate is carried out under light irradiation; wherein the fuel substrate comprises at least one of norbornene, dicylopentadiene, norbornadiene, isophorone, and cyclohexenone;
   and wherein an amount of the p-type $TiO_2$/n-type $WO_3$ heterojunction catalyst is from 1% by mass to 10% by mass with respect to a total amount of the fuel substrate.

7. The method according to claim 6, wherein the fuel is photochemically synthesized from the fuel substrate in a solvent;
   wherein the solvent comprises at least one of dichloromethane, normal pentane, dichloroethane, and cyclohexane.

8. The method according to claim 6, wherein photochemically synthesizing the fuel from the fuel substrate in the presence of the p-type $TiO_2$/n-type $WO_3$ heterojunction catalyst is carried out at a temperature of 0° C. to 80° C. for 1 hour to 24 hours under irradiation of a high-pressure mercury lamp.

9. The method according to claim 7, wherein photochemically synthesizing the fuel from the fuel substrate in the presence of the p-type $TiO_2$/n-type $WO_3$ heterojunction catalyst is carried out at a temperature of 0° C. to 80° C. for 1 hour to 24 hours under irradiation of a high-pressure mercury lamp.

10. The method according to claim 5, wherein the fuel comprises a high-density fuel that is a multi-cyclic fuel for aerospace propulsion;
    wherein the fuel comprises at least one of pentacyclo[8.2.1.1$^{4,7}$.0$^{2,9}$.0$^{8,3}$]tetradecane, pentacyclo[5.3.0.0$^{2,6}$.0$^{3,9}$.0$^{5,8}$]decane, and quadricyclane.

* * * * *